US012789765B2

(12) United States Patent
Kim

(10) Patent No.: US 12,789,765 B2
(45) Date of Patent: Nov. 10, 2026

(54) COMMUNICATION SYSTEM FOR ELECTRO-MECHANICAL BRAKE

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 63 days.

(21) Appl. No.: 18/790,679

(22) Filed: Jul. 31, 2024

(65) Prior Publication Data

US 2025/0214549 A1 Jul. 3, 2025

(30) Foreign Application Priority Data

Dec. 27, 2023 (KR) ........................ 10-2023-0192892

(51) Int. Cl.
*B60T 8/17* (2006.01)

(52) U.S. Cl.
CPC ...................................... *B60T 8/17* (2013.01)

(58) Field of Classification Search
CPC ...... B60T 8/17; B60T 8/885; B60T 2270/402; B60T 2270/406; B60T 2270/413; B60T 2270/82
USPC ........................................................... 701/70
See application file for complete search history.

(56) References Cited

U.S. PATENT DOCUMENTS

2008/0296106 A1* 12/2008 Nilsson .................. B60T 8/345 701/115

* cited by examiner

*Primary Examiner* — Lindsay M Low
*Assistant Examiner* — Omar Morales
(74) *Attorney, Agent, or Firm* — NovoTechIP International PLLC

(57) ABSTRACT

A communication system for an electro-mechanical brake is disclosed. In one aspect, a communication system for an electro-mechanical brake (EMB) system including a brake center controller (BCC) configured to control a plurality of EMB of the EMB system and a plurality of brake wheel controllers (BWCs) disposed in each of the plurality of EMB, the communication system comprises a first communication line configured to connect the BCC to each of BWCs corresponding to a first group, a second communication line configured to connect the BCC to each of BWCs corresponding to a second group, wherein the BWCs corresponding to the second group are not corresponding to the first group among the plurality of BWCs, and a third communication line configured to connect the BCC to each of BWCs corresponding to the first group and the second group.

17 Claims, 4 Drawing Sheets

COMMUNICATION SYSTEM FOR ELECTRO-MECHANICAL BRAKE

CROSS-REFERENCE TO RELATED APPLICATIONS

This application claims priority to and benefit of Korean Patent Application No. 10-2023-0192892, filed on Dec. 27, 2023, the entire disclosure of which is incorporated herein by reference for all purposes.

TECHNICAL FIELD

The present disclosure relates to a communication system for an electro-mechanical brake.

BACKGROUND

The content described in this section simply provides background information for the present disclosure and does not constitute the related art.

A braking apparatus for a vehicle is an apparatus that is used to decelerate or stop a vehicle or maintain a parked state. The braking apparatus for a vehicle uses friction to perform a braking action. The braking apparatus for a vehicle is an important component directly related to the safety of occupants in the vehicle.

An electro-mechanical brake (EMB) can be used as a braking system in order to improve the safety and performance of the braking apparatus for a vehicle. The EMB is an apparatus that controls a braking force using electrical signals rather than directly operating a brake caliper when a driver steps on a brake pedal. The EMB performs a braking function using an independent actuator for each wheel. The EMB can precisely control the braking force because an electronic control system intervenes in a brake operation and controls each wheel independently.

An EMB system includes an EMB mounted on each wheel, and a brake center controller (BCC) for controlling the EMB. The BCC, and a brake wheel controller (BWC) mounted on the EMB communicate with each other to share various commands and information related to braking of the vehicle. The BCC and the BWC generate messages containing various commands and information, and share the generated messages with each other.

Meanwhile, vehicle braking control is evolving to become more precise than before and is evolving to ensure higher stability and reliability. Accordingly, communication data exchanged between the BCC and the BWC is required to be transmitted and received at a higher cycle with a larger amount of information.

SUMMARY

Accordingly, the present disclosure is intended to solve these problems, and a main object of the present disclosure is to provide a communication system for an electro-mechanical brake system configured to transmit and receive communication data consisting of a large amount of information at a high cycle.

Further, another main object of the present disclosure is to provide a communication system for an electro-mechanical brake system capable of ensuring high stability and high reliability even when communication data consisting of a large amount of information is transmitted and received at a high cycle.

Further, the other main object of the present disclosure is to provide a redundant design of a communication system for an electro-mechanical brake system in preparation for the occurrence of a failure.

The problems to be solved by the present disclosure are not limited to the problems mentioned above, and other problems not mentioned can be clearly understood by those skilled in the art from the description below.

In one general aspect, a communication system for an electro-mechanical brake (EMB) system including a brake center controller (BCC) configured to control a plurality of EMB of the EMB system and a plurality of brake wheel controllers (BWCs) disposed in each of the plurality of EMB, the communication system comprises a first communication line configured to connect the BCC to each of BWCs corresponding to a first group, a second communication line configured to connect the BCC to each of BWCs corresponding to a second group, wherein the BWCs corresponding to the second group are not corresponding to the first group among the plurality of BWCs, and a third communication line configured to connect the BCC to each of BWCs corresponding to the first group and the second group.

The cycle time of communication using the third communication line may be longer than cycle time of communication using the first communication line.

The cycle time of communication using the third communication line may be longer than cycle time of communication using the second communication line.

The third communication line may be configured to communicate when at least one of the first communication line and the second communication line fails.

The BCC may include N (an integer equal to or greater than 2) processors, and each of the first communication line, the second communication line, and the third communication line may include N separate communication lines, with each line of the N communication lines being connected to one of the N processors.

The cycle time of communication using the first communication line may be about 3 ms.

The cycle time of communication using the second communication line may be about 3 ms.

The cycle time of communication using the third communication line may be about 4 ms.

The first communication line, the second communication line, and the third communication line may be configured to local control area network (CAN) communication lines. As described above, according to the present embodiment, there is an effect that it is possible to provide a communication system for an electro-mechanical brake system configured to transmit and receive communication data consisting of a large amount of information at a high cycle.

Further, the present disclosure has an effect that it is possible to provide a communication system for an electro-mechanical brake system capable of ensuring high stability and high reliability even when communication data consisting of a large amount of information is transmitted and received at a high cycle.

Further, the present disclosure has an effect that it is possible to provide a redundant design of a communication system for an electro-mechanical brake system in preparation for the occurrence of a failure.

DETAILED DESCRIPTION

Figure 1:
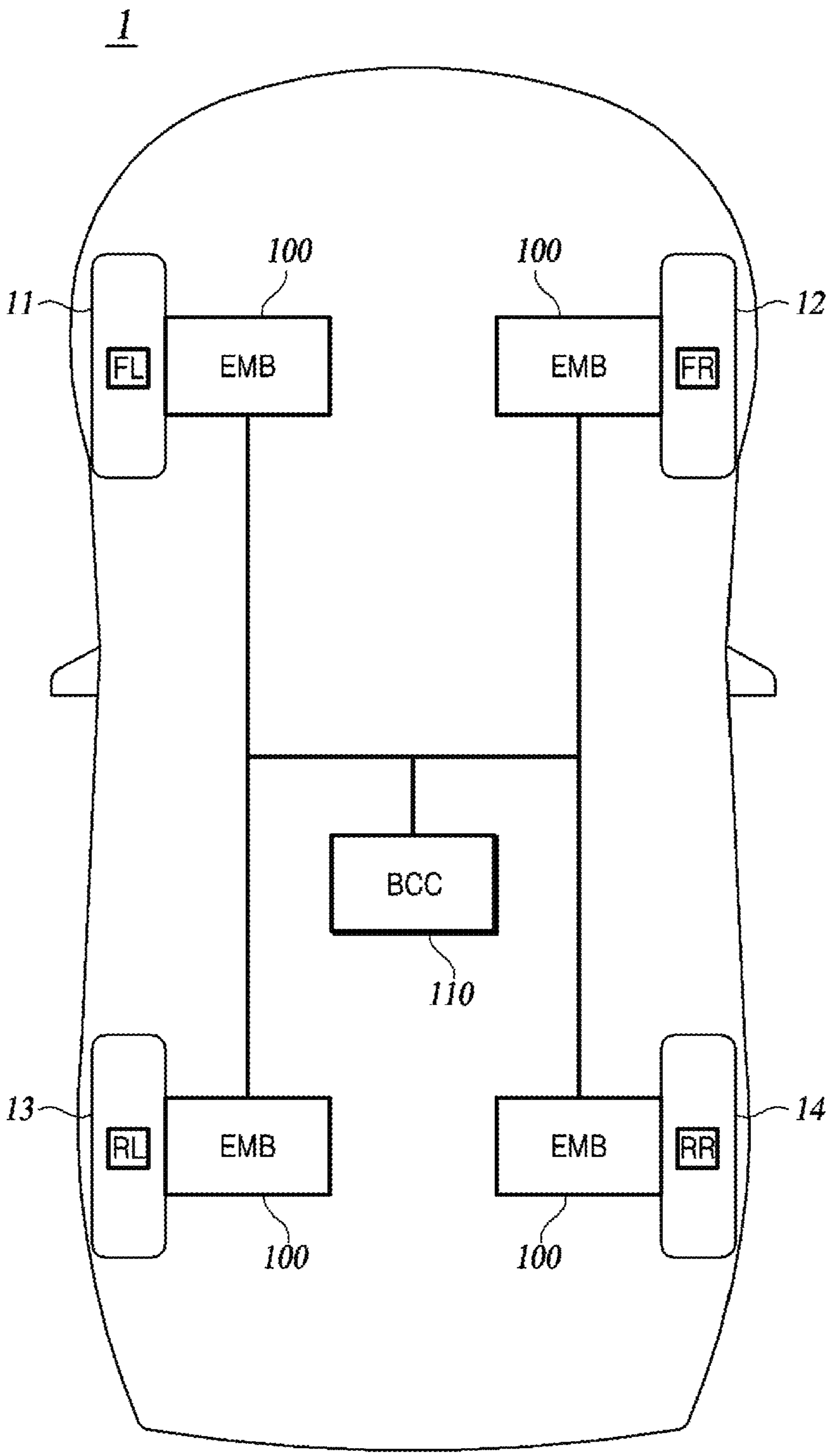
FIG. 1 is a diagram schematically showing an electro-mechanical brake (EMB) system installed in a vehicle according to an embodiment of the present disclosure.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The objects of the present disclosure are not limited to those particularly described hereinabove, and the above and other objects that the present disclosure can achieve will be clearly understood by those skilled in the art from the following detailed description.

Hereinafter, some various exemplary embodiments of the present disclosure will be described in detail with reference to the accompanying drawings. In the following description, like reference numerals preferably designate like elements, although the elements are shown in different drawings. Furthermore, the following description of some various exemplary embodiments will omit for the purpose of clarity and for brevity, a detailed description of related known components and functions when considered obscuring the subject of the present disclosure.

Various ordinal numbers or alpha codes such as first, second, i), ii), a), b), etc., are prefixed solely to differentiate one component from the other but not to imply or suggest the substances, order, or sequence of the components. Throughout the present specification, when a part “includes” or “comprises” a component, the part is meant to further include other components, to not exclude thereof unless specifically stated to the contrary.

The detailed description set forth below in conjunction with the accompanying drawings is intended to describe exemplary embodiments of the present disclosure and is not intended to represent the only embodiments in which the present disclosure may be practiced.

FIG. 1 is a diagram schematically showing an electro-mechanical brake (EMB) system installed in a vehicle according to an embodiment of the present disclosure.

Figure 2:
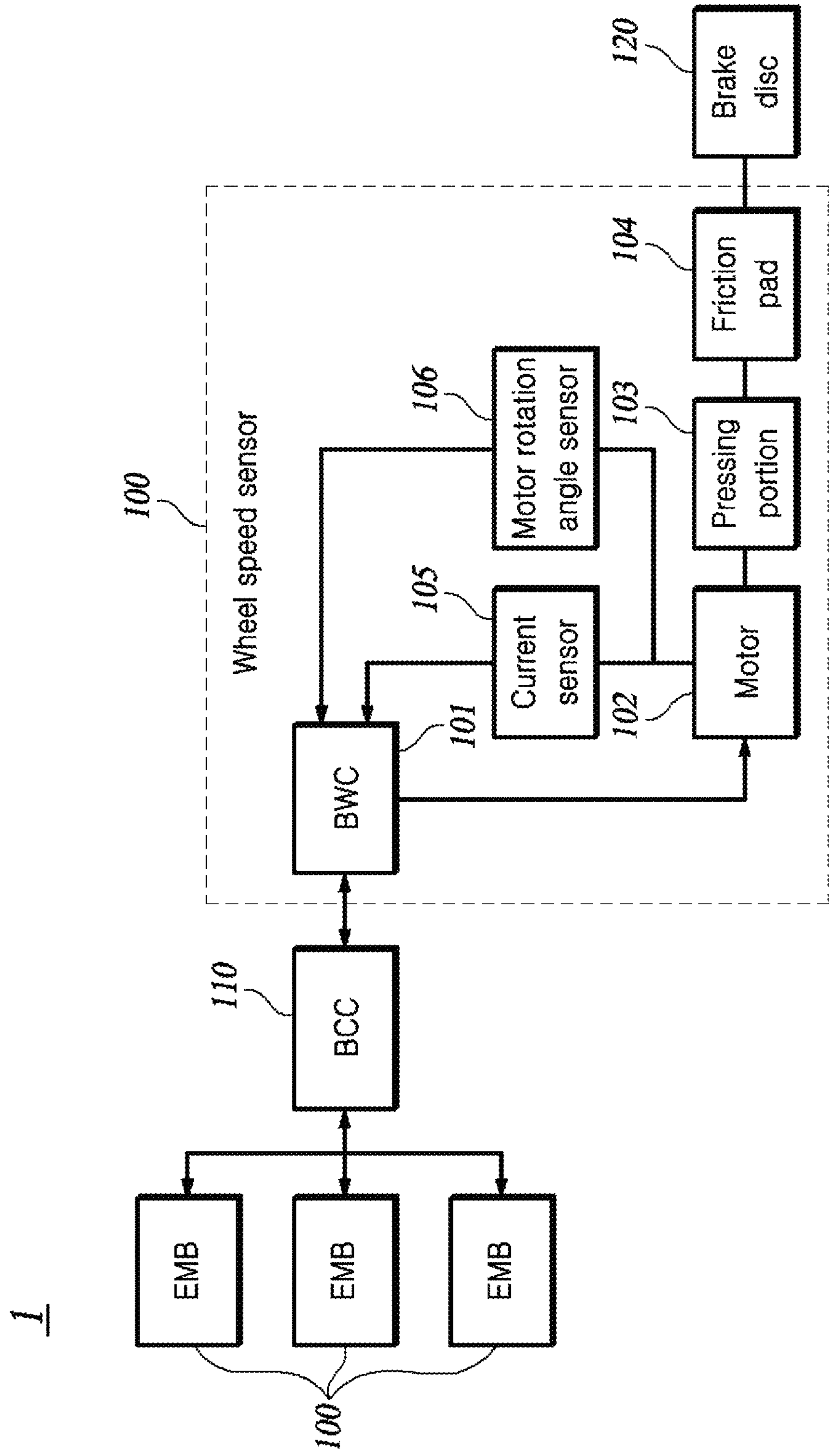
FIG. 2 is a block diagram schematically showing the EMB system according to the embodiment of the present disclosure.

FIG. 2 is a block diagram schematically showing the EMB system according to an embodiment of the present disclosure.

Referring to both FIGS. 1 and 2, the EMB system 1 according to an embodiment of the present disclosure may include a brake center controller (BCC) 110, an electro-mechanical brake (EMB) 100 mounted on each wheel, a wheel speed sensor 107, and a brake disc 120.

The BCC 110 may generate a demanded braking force necessary for braking of the vehicle. For example, the BCC 110 may receive a pedal stroke value from a pedal stroke sensor (not shown) mounted on the vehicle to generate the demanded braking force corresponding to the pedal stroke value.

The BCC 110 may calculate a target clamping force of each of the wheels 11 to 14 to generate the demanded braking force of the vehicle. The BCC 110 may transmit the target clamping force of each of the wheel 11 to 14, to the EMB 100 disposed on each of the wheel 11 to 14 via a IVN (In-Vehicle-Network). The IVN refers to a communication line configured of various communication systems such as a local controller area network (CAN), Flex-Ray, local interconnect network (LIN), or Ethernet.

The EMB 100 may be mounted on each of the wheel 11 to 14 to perform braking of each of the wheel 11 to 14. For example, as shown in FIG. 1, the EMB 100 may be mounted on each of a front left wheel (FL) 11, a front right wheel (FR) 12, and a rear left wheel (RL) 13, and a rear right wheel (RR) 14 to perform braking of each of the front left wheel 11, the front right wheel 12, the rear left wheel 13, and the rear right wheel 14. The EMB 100 may perform braking of the wheels 11 to 14 by converting kinetic energy of the vehicle into heat energy using a friction force.

The EMB 100 may include all or some of a motor 102, a pressing portion 103, a friction pad 104, a current sensor 105, a motor rotation angle sensor 106, a force sensor (not shown), and a brake wheel controller (BWC) 101.

The motor 102 may generate a rotational force and transmit the rotational force to the pressing portion 103. The motor 102 may be a DC motor, an AC motor, an induction motor, a synchronous motor, a step motor, a servo motor, a brushless motor, a linear motor, a permanent magnet synchronous motor (PMSM), or the like.

The pressing portion 103 may include all or some of a gearbox (not shown), a screw (not shown), a nut (not shown), and a piston (not shown).

The gearbox may include a plurality of gears. The gearbox may amplify the rotational force by rotating a plurality of gears in engagement using the rotational force transferred from the motor 102. For example, a gearbox may include a first gear and a second gear. The second gear has a smaller diameter than the first gear. The second gear can directly receive the rotational force from the motor 102. The second gear rotates in engagement with the first gear, thereby transferring the rotational force to the first gear. Since the first gear rotates with a higher rotational force compared to the second gear, the rotational force is doubled.

The screw can receive the amplified rotational force from the gearbox. The screw may convert the amplified rotational force into a linear motion to pressurize or depressurize the piston. The nut is arranged with limited rotation.

The friction pads 104 may be disposed on both sides of the brake disc 120. When the piston is pressurized, the friction pads 104 may press the brake disc 120 from both the sides of the brake disc 120. When the pressing portion 103 presses the friction pad 104 against the brake disc 120, the friction pad 104 is compressed and a clamping force is generated. Here, a point where clamping force begins to be generated is a contact point. As the pressing portion 103 moves from the contact point to the brake disc 120, the friction pad 104 is compressed, and the clamping force increases according to a degree to which the friction pad 104 is compressed.

The current sensor 105 may be mounted on the EMB 100 and used to measure a current flowing in the motor 102. For example, the current sensor 105 may measure an actual motor current using a current sensor signal representing a voltage difference between both terminals of a shunt resistor mounted in a motor driving circuit.

The motor rotation angle sensor 106 may be mounted on the EMB 100 to detect the motor rotation angle, convert the motor rotation angle into a voltage signal, and output a motor rotation angle sensor signal as an analog signal. For example, the motor rotation angle sensor 106 may output a sine signal and a cosine signal as an analog signal.

The force sensor may be mounted on the EMB 100 to detect the actual clamping force, convert the actual clamping force into a voltage signal, and output a force sensor signal as an analog signal.

The BWC 101 may receive the target clamping force from the BCC 110 via the IVN. The BWC 101 can receive the current sensor signal, the motor rotation angle sensor signal, and the force sensor signal.

The BWC 101 may calculate the actual motor current using the current sensor signal, and calculate a motor angular speed and an actual stroke of the piston using the motor rotation angle sensor signal.

The BWC 101 may generate clamping force feedback using the force sensor signal. On the other hand, in a case where there is no force sensor, the BWC 101 may generate the clamping force feedback by estimating the contact point and a home position using the actual stroke of the piston and the actual motor current. Here, the home position means the actual stroke of the piston in a state where the EMB 100 does not operate. As another example, the BWC 101 may generate the clamping force feedback by using artificial intelligence (AI). Here, the artificial intelligence may be trained to receive the current sensor signal and the motor rotation angle sensor signals and output the actual clamping force.

The wheel speed sensor 107 may measure a speed of each of the wheels 11 to 14. The wheel speed sensor 107 may be configured as a magnetic induction type wheel speed sensor 107 or a Hall effect type wheel speed sensor 107. When the wheel speed sensor 107 is configured as the magnetic induction type wheel speed sensor, a magnetic field is generated in a coil as the wheels 11 to 14 rotate, and the magnetic field can be detected using the wheel speed sensor 107. When the wheel speed sensor 107 is configured as the magnetic induction type wheel speed sensor, the wheel speed sensor 107 may calculate a rotational speed of the wheels 11 to 14 by measuring an intensity of the detected magnetic field. On the other hand, when the wheel speed sensor 107 is configured as the Hall effect type wheel speed sensor 107, magnets mounted on the wheels 11 to 14 may pass through the Hall sensor as the wheels 11 to 14 rotate. The Hall sensor may calculate the rotational speed of the wheels 11 to 14 by measuring a Hall effect that occurs when the magnet passes through the Hall sensor.

Meanwhile, the BCC 110 not only serves to transmit the target clamping force based on a braking intention of the driver to the EMB 100, but also serves to generate information necessary to perform braking control according to special functions such as anti-lock brake system (ABS) and electronic stability control (ESC) and transmit the information to the EMB 100.

The ABS is control for preventing each of the wheels 11 to 14 from sticking when the vehicle is braked. Specifically, the ABS is control for adjusting a wheel slip ratio of the wheel 11 to 14 into a wheel slip ratio with the highest braking efficiency depending on a current state of a road surface. The sticking of the wheels 11 to 14 may occur in cases of hard braking of the vehicle or adverse conditions of the road surface.

The ESC is a control that helps the driver control the vehicle more safely by improving handling of the vehicle and preventing skidding or excessive rotation. Specifically, the ESC is a control for preventing oversteer or understeer from occurring by additionally performing braking of some wheels (at least one of 11 to 14) in the case of oversteer in which the vehicle rotates excessively or in the case of understeer in which the vehicle rotates insufficiently.

The parameters required for the braking control according to the special functions such as anti-lock brake system (ABS) and electronic stability control (ESC) are generated from the BCC 110 and transmitted to the BWC 101, as described above. Since the vehicle braking must be performed quickly and accurately, information transmitted from the BCC 110 to the BWC 101 via a communication line must be transmitted while satisfying a short communication cycle, low degradation, and high reliability. Hereinafter, a communication line design for satisfying communication between the BCC 110 and the BWC 101 according to the above-described conditions will be described in detail.

Meanwhile, the communication line according to the present disclosure may be included as various communication lines, but is preferably included as a local CAN communication line. When the communication line according to the present disclosure is included as the local CAN communication line, there is an effect that it is possible to solve problems such as an increased size, increased cost, and increased likelihood of occurrence of an error due to connector complexity.

Figure 3:
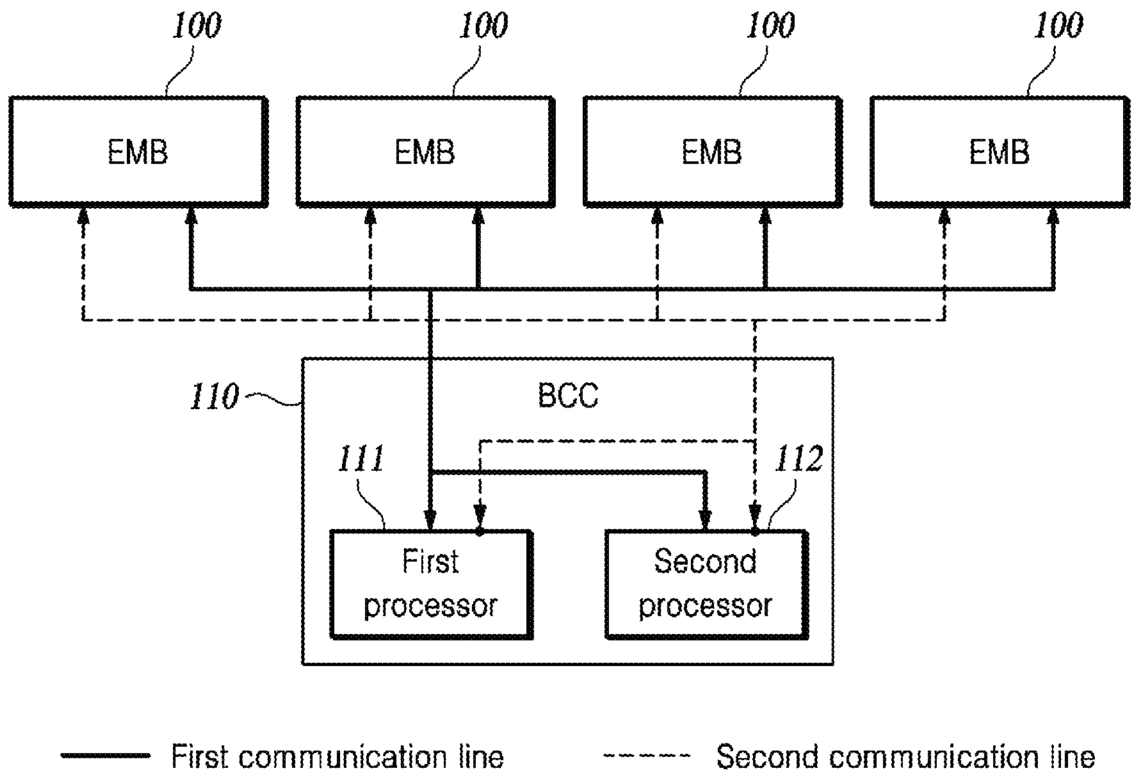
FIG. 3 is a block diagram schematically showing a communication system for an EMB system according to an embodiment of the present disclosure.

FIG. 3 is a block diagram schematically showing a communication system for an EMB system according to an embodiment of the present disclosure.

Referring to FIG. 3, the communication system for an EMB system 1 according to an embodiment of the present disclosure may include a first communication line and a second communication line.

The first communication line may be configured to connect the BCC 110 to each of the plurality of BWCs 101 to communicate with each other with the BCC 110 as a center. Similarly, the second communication line may be configured to connect the BCC 110 to each of the plurality of BWCs 101 to communicate with each other with the BCC 110 as a center.

In the communication system for an EMB system 1 according to the embodiment of the present disclosure, the first communication line and the second communication line are configured based on a redundant design of the communication system. Specifically, one of the first communication line and the second communication line is used as a main communication line, and the other communication line is used as a backup communication line. Therefore, in the communication system for the EMB system 1 according to an embodiment of the present disclosure, when a malfunction occurs in one of the first communication line and the second communication line, the other communication line may be configured to cope with the failure of the communication line by taking over the role.

However, the communication system for an EMB system 1 according to the embodiment of the present disclosure has a problem in that there is a limit to reducing the communication cycle time when an amount of data to be transmitted increases. Specifically, when the communication cycle time is set in units of 4 ms or more in consideration of a general communication cycle time, communication can be performed without any major problems, but appropriate data transmission may not be performed as a load factor of the communication line increases when the communication cycle time is set in units of 3 ms or less. For example, when the ABS is performed, the BCC 110 receives the speed of the wheel (at least one of the wheels 11 to 14) from the BWC 101, calculates parameters necessary for performing of the ABS based on the speed, and then, transmits the parameters back to the BWC 101. Since this series of processes increases the load factor of the communication line, appropriate data transmission is not performed so that performance of the ABS may deteriorate.

Figure 4:
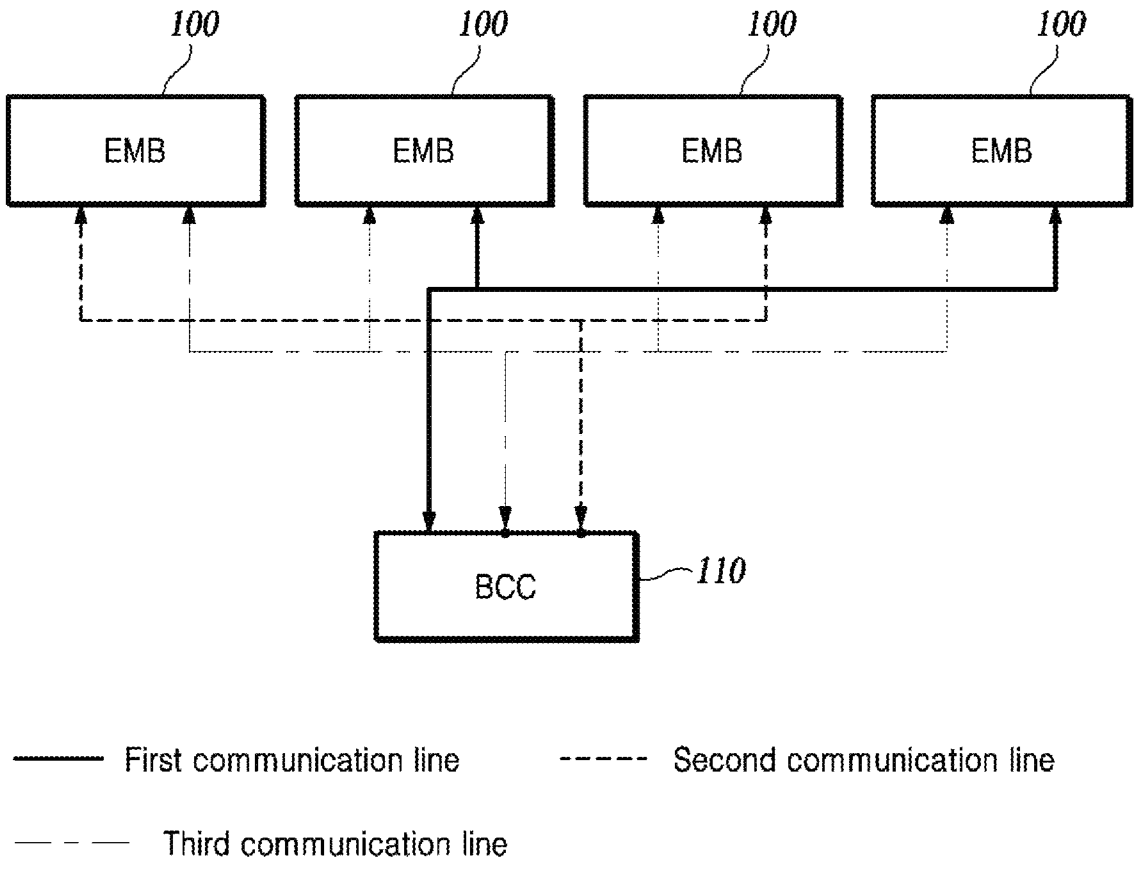
FIG. 4 is a block diagram schematically showing a communication system for an EMB system according to another embodiment of the present disclosure.

FIG. 4 is a block diagram schematically showing a communication system for an EMB system according to another embodiment of the present disclosure.

Referring to FIG. 4, a communication system for the EMB system 1 according to the other embodiment of the present disclosure may include a first communication line, a second communication line, and a third communication line. Here, it is to be noted that the first and second communication lines are different communication lines from the communication lines illustrated in the FIG. 3.

The first communication line is a communication line that connects the BCC 110 to each of BWCs 101 corresponding to a first group to communicate with each other with the BCC 110 as the center. The BWCs 101 corresponding to the first group are some BWCs 101 among the plurality of BWCs 101.

The second communication line is a communication line that connects the BCC 110 to each of BWCs 101 corresponding to the second group to communicate with each other with the BCC 110 as the center. The BWCs 101 corresponding to the second group are BWCs 101 that does not correspond to the first group among the plurality of BWCs 101.

The third communication line is a communication line that connects the BCC 110 to the plurality of BWCs 101 to communicate with each other with the BCC 110 as a center. In other words, the third communication line connects the BCC 110 to each of the BWCs 101 which are corresponding to the first group and the second group.

According to one of examples of setting the communication cycle time, cycle time of communication between the BCC 110 and each of the plurality of BWCs performed using the third communication line may be set to be longer than cycle time of communication between the BCC 110 and each of the BWCs 101 corresponding to the first group performed using the first communication line. Further, the cycle time of communication between the BCC 110 and each of the plurality of BWCs performed using the third communication line may be set to be longer than cycle time of communication between the BCC 110 and each of the BWCs 101 corresponding to the second group performed using the second communication line. According to this example, there is an effect that it is possible to increase communication efficiency and accuracy by adjusting a communication load factor for the first to third communication lines.

In the communication system for an EMB system 1 according to the other embodiment of the present disclosure, the first communication line and the second communication line may be configured as a main communication line, and the third communication line may be configured as a backup communication line. Further, the first group and the second group can be classified according to various separation structures such as a front-rear wheel separation structure or an X-split structure. For example, when the first group and the second group are classified according to the front-rear wheel separation structure, the BWCs 101 mounted on the FL 11 and the FR 12 may be included in the first group, the BWCs 101 mounted on the RL 13 and the RR 14 may be included in the second group.

Since the first communication line and the second communication line according to the other embodiment are configured to connect some of the plurality of BWCs 101 to the BCC 110 unlike the communication system for the EMB system 1 according to the embodiment, it is possible to reduce the load factor of the communication line compared to the previous embodiment. Accordingly, the first communication line and the second communication line according to the other embodiment can perform communication at a short communication cycle time. For example, the cycle time of communication between the BCC 110 and each of BWCs 101 corresponding to the first group performed using the first communication line may be set to 3 ms or less. Further, the cycle time of communication between the BCC 110 and each of BWCs 101 corresponding to the second group is performed using the second communication line may be set to 3 ms or less. On the other hand, the cycle time of communication between the BCC 110 and each of the plurality of BWCs 101 performed using the third communication line may be set to 4 ms or more.

In the communication system for the EMB system 1 according to the other embodiment of the present disclosure, the third communication line may be provided as a sub-communication line, unlike the first communication line and the second communication line. For example, the third communication line may serve to transmit and receive only data for assisting the first communication line and the second communication line, except for special situations (occurrence of a failure, accident, or the like).

In some embodiments, the third communication line may be configured to allow communication only when at least one of the first communication line and the second communication line fails. This is intended to increase communication efficiency and accuracy. For example, when the first to third communication lines operate simultaneously, a situation in which the communication load factor of the controllers 110 and 101 may become excessively high or data may be deteriorate due to collision between a plurality of data may occur. In this embodiment, the third communication line is operated only when at least one of the first communication line and the second communication line fails, thereby providing an effect that it is possible to cope with the above-described situations.

The communication system for an EMB system 1 according to the other embodiment of the present disclosure provides a triple safety design by providing three communication lines. For example, when one of the three communication lines fails, braking can be performed using the two other communication lines. Further, even when two of the three communication lines fail, braking can be performed using the remaining communication line.

Meanwhile, in some embodiments, the BCC 110 may include a plurality of processors 111 and 112 depending on a required data processing amount, data operation load, safety factor, and the like. That is, the BCC 110 may include N (an integer equal to or greater than 2) processors. In this case, the first to third communication lines may be designed so that respective N communication lines are disposed in a redundant manner, with each of the N processors 111, 112, . . . , 11N treated as one BCC 110. For example, when the BCC 110 includes a first processor 111 and a second processor 112, the first to third communication lines may be configured to treat each of the first processor 111 and the second processor 112 as one BCC 110, respectively, and connect the respective processors 111 and 112 to the BWCs 101. When a plurality of components is designed in a redundant manner as described above, it is possible to provide an effect that the reliability and stability of braking directly related to the safety of vehicle occupants are ensured.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A communication system for an electro-mechanical brake (EMB) system including a brake center controller (BCC) configured to control a plurality of electro-mechanical brakes (EMBs) of the EMB system and a plurality of brake wheel controllers (BWCs) respectively disposed in each of the plurality of EMBs, the communication system comprising:

a first communication line configured to connect the BCC to a first group of the BWCs so that the BCC is connected to each of the BWCs of the first group;

a second communication line configured to connect the BCC to a second group of the BWCs so that the BCC is connected to each of the BWCs of the second group of BWCs, wherein the BWCs in the second group are different than the BWCs in the first group among the plurality of BWCs; and a third communication line configured to connect the BCC to each of the BWCs in the first group and in the second group of BWCs.

2. The communication system of claim 1, wherein a cycle time of communication using the third communication line is longer than a cycle time of communication using the first communication line.

3. The communication system of claim 1, wherein a cycle time of communication using the third communication line is longer than a cycle time of communication using the second communication line.

4. The communication system of claim 1, wherein the third communication line is configured to communicate with each of the BWCs in the first and second group of BWCs when at least one of the first communication line and the second communication line fails.

5. The communication system of claim 1, wherein:

the BCC includes N (where Nis an integer equal to or greater than 2) processors, and each of the first communication line, the second communication line, and the third communication line includes N separate communication lines, with each line of the N communication lines being respectively connected to one of the N processors.

6. The communication system of claim 1, wherein a cycle time of communication using the first communication line is about 3 ms.

7. The communication system of claim 1, wherein a cycle time of communication using the second communication line is about 3 ms.

8. The communication system of claim 1, wherein a cycle time of communication using the third communication line is about 4 ms.

9. The communication system of claim 1, wherein the first communication line, the second communication line, and the third communication line are configured to be local control area network (CAN) communication lines.

10. The communication system of claim 1, wherein:

the vehicle is a 4-wheel vehicle;

the first pair of wheels is comprised of two front wheels of the 4-wheel vehicle; and the second pair of wheels is comprised of two rear wheels of the 4-wheel vehicle.

11. The communication system of claim 1, wherein:

the vehicle is a 4-wheel vehicle;

the first pair of wheels is one front wheel and one rear wheel of a 4-wheel vehicle; and the second pair of wheels is another front wheel and another rear wheel of the 4-wheel vehicle.

12. The communication system of claim 1, wherein the third communication line is configured to be a backup communication line which only allows communication over the third communication line when at least one of the first communication line and the second communication line fails.

13. The communication system of claim 1, wherein the third communication line is configured as a sub-communication line to transmit and receive data for assisting the first communication line and the second communication line.

14. The communication system of claim 13, wherein the third communication line is also configured to be a backup communication line which allows communication over the third communication line, other than of data for assisting the first communication line and the second communication line, when at least one of the first communication line and the second communication line fails.

15. The communication system of claim 1, wherein the electro-mechanical brake (EMB) system is for a vehicle having at least four wheels, and wherein each of the BWCs is connected to a different one of the at least four wheels.

16. The communication system of claim 15, wherein the second group of BWCs is connected, respectively, to a second pair of the at least four wheels which is different than the first pair of wheels.

17. The communication system of claim 16, wherein the third communication line configured to connect the BCC to each of the BWCs in the first group and in the second group of BWCs so that the third communication line is connected to BWCs connected to both the first pair of wheels and the second pair of wheels.

* * * * *